United States Patent
Wang et al.

(10) Patent No.: US 9,014,066 B1
(45) Date of Patent: Apr. 21, 2015

(54) SYSTEM AND METHOD FOR TRANSMIT AND RECEIVE ANTENNA PATTERNS CALIBRATION FOR TIME DIVISION DUPLEX (TDD) SYSTEMS

(71) Applicant: Magnolia Broadband Inc., Englewood, NJ (US)

(72) Inventors: Sherwin J. Wang, Towaco, NJ (US); Haim Harel, New York, NY (US); Kenneth Kludt, San Jose, CA (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 14/281,358

(22) Filed: May 19, 2014

Related U.S. Application Data

(60) Provisional application No. 61/909,135, filed on Nov. 26, 2013, provisional application No. 61/946,273, filed on Feb. 28, 2014.

(51) Int. Cl.
  *H04J 3/00* (2006.01)
  *H04L 5/14* (2006.01)
  (Continued)

(52) U.S. Cl.
  CPC ............... *H04B 7/0665* (2013.01); *H04B 1/56* (2013.01); *H04B 7/0682* (2013.01)

(58) Field of Classification Search
  CPC .......... H04B 1/50; H04B 1/56; H04B 7/2656; H04Q 11/04; H04L 5/1492; H04W 80/04; H04W 88/06; H04W 28/04; H04W 72/04; H04W 72/0446; H04W 84/12; H04W 74/04

USPC ......... 370/277, 280, 294, 328, 329, 336, 337, 370/345, 347, 442
  See application file for complete search history.

(56) References Cited

U.S. PATENT DOCUMENTS

| 4,044,359 A | 8/1977 | Applebaum et al. |
| 4,079,318 A | 3/1978 | Kinoshita |

(Continued)

FOREIGN PATENT DOCUMENTS

| EP | 1 189 303 | 3/2002 |
| EP | 1 867 177 | 5/2010 |

(Continued)

OTHER PUBLICATIONS

Notice of Allowance issued by the United States Patent and Trademark Office for U.S. Appl. No. 14/085,352 dated Jul. 23, 2014.

(Continued)

*Primary Examiner* — Ronald Abelson
(74) *Attorney, Agent, or Firm* — Pearl Cohen Zedek Latzer Baratz LLP

(57) ABSTRACT

A method and system for applying a calibration procedure to match the peaks and nulls of the transmit and receive antenna patterns of a communication device are provided herein. The system may include: a plurality of antennas having tunable phases and configured for both transmitting and receiving; a plurality of radio circuits configured to transmit and receive via said antennas in a time division duplex (TDD) communication protocol; and a computer processor configured to calculate a weight setting difference between the transmit and the receive antenna pattern, wherein the antenna pattern is a peak-null pattern of the plurality of antennas operating together. The calibration value may enable the calibrated communication device to apply channel reciprocity to the beam-forming and/or nulling applications.

27 Claims, 11 Drawing Sheets

(51) Int. Cl.
  *H04W 4/00* (2009.01)
  *H04B 7/212* (2006.01)
  *H04B 1/56* (2006.01)
  *H04B 7/06* (2006.01)

(56) References Cited

U.S. PATENT DOCUMENTS

| | | |
|---|---|---|
| 4,359,738 A | 11/1982 | Lewis |
| 4,540,985 A | 9/1985 | Clancy et al. |
| 4,628,320 A | 12/1986 | Downie |
| 5,162,805 A | 11/1992 | Cantrell |
| 5,363,104 A | 11/1994 | Richmond |
| 5,444,762 A | 8/1995 | Frey et al. |
| 5,732,075 A | 3/1998 | Tangemann et al. |
| 5,915,215 A | 6/1999 | Williams et al. |
| 5,936,577 A | 8/1999 | Shoki et al. |
| 5,940,033 A | 8/1999 | Locher et al. |
| 6,018,317 A | 1/2000 | Dogan et al. |
| 6,026,081 A | 2/2000 | Hamabe |
| 6,046,655 A | 4/2000 | Cipolla |
| 6,101,399 A | 8/2000 | Raleigh et al. |
| 6,163,695 A | 12/2000 | Takemura |
| 6,167,286 A | 12/2000 | Ward et al. |
| 6,215,812 B1 | 4/2001 | Young et al. |
| 6,226,507 B1 | 5/2001 | Ramesh et al. |
| 6,230,123 B1 | 5/2001 | Mekuria et al. |
| 6,259,683 B1 | 7/2001 | Sekine et al. |
| 6,297,772 B1 | 10/2001 | Lewis |
| 6,321,077 B1 | 11/2001 | Saitoh et al. |
| 6,335,953 B1 | 1/2002 | Sanderford et al. |
| 6,370,378 B1 | 4/2002 | Yahagi |
| 6,377,783 B1 | 4/2002 | Lo et al. |
| 6,393,282 B1 | 5/2002 | Iimori |
| 6,584,115 B1 | 6/2003 | Suzuki |
| 6,697,622 B1 | 2/2004 | Ishikawa et al. |
| 6,697,633 B1 | 2/2004 | Dogan et al. |
| 6,834,073 B1 | 12/2004 | Miller et al. |
| 6,842,460 B1 | 1/2005 | Olkkonen et al. |
| 6,914,890 B1 | 7/2005 | Tobita et al. |
| 6,927,646 B2 | 8/2005 | Niemi |
| 6,975,582 B1 | 12/2005 | Karabinis et al. |
| 6,987,958 B1 | 1/2006 | Lo et al. |
| 7,068,628 B2 | 6/2006 | Li et al. |
| 7,177,663 B2 | 2/2007 | Axness et al. |
| 7,190,964 B2 | 3/2007 | Damnjanovic et al. |
| 7,257,425 B2 | 8/2007 | Wang et al. |
| 7,299,072 B2 | 11/2007 | Ninomiya |
| 7,391,757 B2 | 6/2008 | Haddad et al. |
| 7,392,015 B1 | 6/2008 | Farlow et al. |
| 7,474,676 B2 | 1/2009 | Tao et al. |
| 7,499,109 B2 | 3/2009 | Kim et al. |
| 7,512,083 B2 | 3/2009 | Li |
| 7,606,528 B2 | 10/2009 | Mesecher |
| 7,634,015 B2 | 12/2009 | Waxman |
| 7,646,744 B2 | 1/2010 | Li |
| 7,719,993 B2 | 5/2010 | Li et al. |
| 7,742,000 B2 | 6/2010 | Mohamadi |
| 7,769,107 B2 | 8/2010 | Sandhu et al. |
| 7,898,478 B2 | 3/2011 | Niu et al. |
| 7,904,086 B2 | 3/2011 | Kundu et al. |
| 7,933,255 B2 | 4/2011 | Li |
| 7,970,366 B2 | 6/2011 | Arita et al. |
| 8,078,109 B1 | 12/2011 | Mulcay |
| 8,103,284 B2 | 1/2012 | Mueckenheim et al. |
| 8,115,679 B2 | 2/2012 | Falk |
| 8,155,613 B2 | 4/2012 | Kent et al. |
| 8,275,377 B2 | 9/2012 | Nanda et al. |
| 8,280,443 B2 | 10/2012 | Tao et al. |
| 8,294,625 B2 | 10/2012 | Kittinger et al. |
| 8,306,012 B2 | 11/2012 | Lindoff et al. |
| 8,315,671 B2 | 11/2012 | Kuwahara et al. |
| 8,369,436 B2 | 2/2013 | Stirling-Gallacher |
| 8,509,190 B2 | 8/2013 | Rofougaran |
| 8,520,657 B2 | 8/2013 | Rofougaran |
| 8,526,886 B2 | 9/2013 | Wu et al. |
| 8,588,844 B2 | 11/2013 | Shpak |
| 8,599,955 B1 | 12/2013 | Kludt et al. |
| 8,599,979 B2 | 12/2013 | Farag et al. |
| 8,611,288 B1 | 12/2013 | Zhang et al. |
| 8,644,413 B2 | 2/2014 | Harel et al. |
| 8,649,458 B2 | 2/2014 | Kludt et al. |
| 8,666,319 B2 | 3/2014 | Kloper et al. |
| 8,744,511 B2 | 6/2014 | Jones et al. |
| 8,767,862 B2 | 7/2014 | Abreu et al. |
| 8,780,743 B2 | 7/2014 | Sombrutzki et al. |
| 2001/0029326 A1 | 10/2001 | Diab et al. |
| 2001/0038665 A1 | 11/2001 | Baltersee et al. |
| 2002/0024975 A1 | 2/2002 | Hendler |
| 2002/0051430 A1 | 5/2002 | Kasami et al. |
| 2002/0065107 A1 | 5/2002 | Harel et al. |
| 2002/0085643 A1 | 7/2002 | Kitchener et al. |
| 2002/0107013 A1 | 8/2002 | Fitzgerald |
| 2002/0115474 A1 | 8/2002 | Yoshino et al. |
| 2002/0181426 A1 | 12/2002 | Sherman |
| 2002/0181437 A1 | 12/2002 | Ohkubo et al. |
| 2003/0087645 A1 | 5/2003 | Kim et al. |
| 2003/0114162 A1 | 6/2003 | Chheda et al. |
| 2003/0153322 A1 | 8/2003 | Burke et al. |
| 2003/0153360 A1 | 8/2003 | Burke et al. |
| 2003/0186653 A1 | 10/2003 | Mohebbi et al. |
| 2003/0203717 A1 | 10/2003 | Chuprun et al. |
| 2003/0203743 A1 | 10/2003 | Sugar et al. |
| 2004/0023693 A1 | 2/2004 | Okawa et al. |
| 2004/0056795 A1 | 3/2004 | Ericson et al. |
| 2004/0063455 A1 | 4/2004 | Eran et al. |
| 2004/0081144 A1 | 4/2004 | Martin et al. |
| 2004/0121810 A1 | 6/2004 | Goransson et al. |
| 2004/0125899 A1 | 7/2004 | Li et al. |
| 2004/0125900 A1 | 7/2004 | Liu et al. |
| 2004/0142696 A1 | 7/2004 | Saunders et al. |
| 2004/0147266 A1 | 7/2004 | Hwang et al. |
| 2004/0156399 A1 | 8/2004 | Eran |
| 2004/0166902 A1 | 8/2004 | Castellano et al. |
| 2004/0198292 A1 | 10/2004 | Smith et al. |
| 2004/0228388 A1 | 11/2004 | Salmenkaita |
| 2004/0235527 A1 | 11/2004 | Reudink et al. |
| 2004/0264504 A1 | 12/2004 | Jin |
| 2005/0068230 A1 | 3/2005 | Munoz et al. |
| 2005/0068918 A1 | 3/2005 | Mantravadi et al. |
| 2005/0075140 A1 | 4/2005 | Famolari |
| 2005/0129155 A1 | 6/2005 | Hoshino |
| 2005/0147023 A1 | 7/2005 | Stephens et al. |
| 2005/0163097 A1 | 7/2005 | Do et al. |
| 2005/0245224 A1 | 11/2005 | Kurioka |
| 2005/0250544 A1 | 11/2005 | Grant et al. |
| 2005/0254513 A1 | 11/2005 | Cave et al. |
| 2005/0265436 A1 | 12/2005 | Suh et al. |
| 2005/0286440 A1 | 12/2005 | Strutt et al. |
| 2005/0287962 A1 | 12/2005 | Mehta et al. |
| 2006/0041676 A1 | 2/2006 | Sherman |
| 2006/0092889 A1 | 5/2006 | Lyons et al. |
| 2006/0094372 A1 | 5/2006 | Ahn et al. |
| 2006/0098605 A1 | 5/2006 | Li |
| 2006/0111149 A1 | 5/2006 | Chitrapu et al. |
| 2006/0135097 A1 | 6/2006 | Wang et al. |
| 2006/0183503 A1 | 8/2006 | Goldberg |
| 2006/0203850 A1 | 9/2006 | Johnson et al. |
| 2006/0227854 A1 | 10/2006 | McCloud et al. |
| 2006/0264184 A1 | 11/2006 | Li et al. |
| 2006/0270343 A1 | 11/2006 | Cha et al. |
| 2006/0271969 A1 | 11/2006 | Takizawa et al. |
| 2006/0285507 A1 | 12/2006 | Kinder et al. |
| 2007/0041398 A1 | 2/2007 | Benveniste |
| 2007/0058581 A1 | 3/2007 | Benveniste |
| 2007/0076675 A1 | 4/2007 | Chen |
| 2007/0093261 A1 | 4/2007 | Hou et al. |
| 2007/0097918 A1 | 5/2007 | Cai et al. |
| 2007/0115882 A1 | 5/2007 | Wentink |
| 2007/0115914 A1 | 5/2007 | Ohkubo et al. |
| 2007/0152903 A1 | 7/2007 | Lin et al. |
| 2007/0217352 A1 | 9/2007 | Kwon |
| 2007/0223380 A1 | 9/2007 | Gilbert et al. |
| 2007/0249386 A1 | 10/2007 | Bennett |
| 2008/0043867 A1 | 2/2008 | Blanz et al. |

(56) References Cited

U.S. PATENT DOCUMENTS

| | | |
|---|---|---|
| 2008/0051037 A1 | 2/2008 | Molnar et al. |
| 2008/0081671 A1* | 4/2008 | Wang et al. ................ 455/562.1 |
| 2008/0095163 A1 | 4/2008 | Chen et al. |
| 2008/0108352 A1 | 5/2008 | Montemurro et al. |
| 2008/0144737 A1 | 6/2008 | Naguib |
| 2008/0165732 A1 | 7/2008 | Kim et al. |
| 2008/0238808 A1 | 10/2008 | Arita et al. |
| 2008/0240314 A1 | 10/2008 | Gaal et al. |
| 2008/0267142 A1 | 10/2008 | Mushkin et al. |
| 2008/0280571 A1 | 11/2008 | Rofougaran et al. |
| 2008/0285637 A1 | 11/2008 | Liu et al. |
| 2009/0003299 A1 | 1/2009 | Cave et al. |
| 2009/0028225 A1 | 1/2009 | Runyon et al. |
| 2009/0046638 A1 | 2/2009 | Rappaport et al. |
| 2009/0058724 A1 | 3/2009 | Xia et al. |
| 2009/0121935 A1 | 5/2009 | Xia et al. |
| 2009/0137206 A1 | 5/2009 | Sherman et al. |
| 2009/0154419 A1 | 6/2009 | Yoshida et al. |
| 2009/0187661 A1 | 7/2009 | Sherman |
| 2009/0190541 A1 | 7/2009 | Abedi |
| 2009/0227255 A1 | 9/2009 | Thakare |
| 2009/0239486 A1 | 9/2009 | Sugar et al. |
| 2009/0268616 A1 | 10/2009 | Hosomi |
| 2009/0285331 A1 | 11/2009 | Sugar et al. |
| 2009/0322610 A1 | 12/2009 | Hants et al. |
| 2009/0322613 A1 | 12/2009 | Bala et al. |
| 2009/0323608 A1 | 12/2009 | Adachi et al. |
| 2010/0002656 A1 | 1/2010 | Ji et al. |
| 2010/0037111 A1 | 2/2010 | Ziaja et al. |
| 2010/0040369 A1 | 2/2010 | Zhao et al. |
| 2010/0067473 A1 | 3/2010 | Cave et al. |
| 2010/0111039 A1 | 5/2010 | Kim et al. |
| 2010/0117890 A1 | 5/2010 | Vook et al. |
| 2010/0135420 A1 | 6/2010 | Xu et al. |
| 2010/0150013 A1 | 6/2010 | Hara et al. |
| 2010/0172429 A1 | 7/2010 | Nagahama et al. |
| 2010/0195560 A1 | 8/2010 | Nozaki et al. |
| 2010/0195601 A1 | 8/2010 | Zhang |
| 2010/0208712 A1 | 8/2010 | Wax et al. |
| 2010/0222011 A1 | 9/2010 | Behzad |
| 2010/0232355 A1 | 9/2010 | Richeson et al. |
| 2010/0234071 A1 | 9/2010 | Shabtay et al. |
| 2010/0278063 A1 | 11/2010 | Kim et al. |
| 2010/0283692 A1 | 11/2010 | Achour et al. |
| 2010/0285752 A1 | 11/2010 | Lakshmanan et al. |
| 2010/0291931 A1 | 11/2010 | Suemitsu et al. |
| 2010/0303170 A1 | 12/2010 | Zhu et al. |
| 2010/0316043 A1 | 12/2010 | Doi et al. |
| 2011/0019639 A1 | 1/2011 | Karaoguz et al. |
| 2011/0032849 A1 | 2/2011 | Yeung et al. |
| 2011/0032972 A1 | 2/2011 | Wang et al. |
| 2011/0085465 A1 | 4/2011 | Lindoff et al. |
| 2011/0085532 A1 | 4/2011 | Scherzer et al. |
| 2011/0105036 A1 | 5/2011 | Rao et al. |
| 2011/0116489 A1 | 5/2011 | Grandhi |
| 2011/0134816 A1 | 6/2011 | Liu et al. |
| 2011/0150050 A1 | 6/2011 | Trigui et al. |
| 2011/0150066 A1 | 6/2011 | Fujimoto |
| 2011/0151826 A1 | 6/2011 | Miller et al. |
| 2011/0163913 A1 | 7/2011 | Cohen et al. |
| 2011/0205883 A1 | 8/2011 | Mihota |
| 2011/0205998 A1 | 8/2011 | Hart et al. |
| 2011/0228742 A1 | 9/2011 | Honkasalo et al. |
| 2011/0249576 A1 | 10/2011 | Chrisikos et al. |
| 2011/0250884 A1 | 10/2011 | Brunel et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2011/0310827 A1 | 12/2011 | Srinivasa et al. |
| 2011/0310853 A1 | 12/2011 | Yin et al. |
| 2012/0014377 A1 | 1/2012 | Joergensen et al. |
| 2012/0015603 A1 | 1/2012 | Proctor et al. |
| 2012/0020396 A1 | 1/2012 | Hohne et al. |
| 2012/0027000 A1 | 2/2012 | Wentink |
| 2012/0028638 A1 | 2/2012 | Mueck et al. |
| 2012/0028655 A1 | 2/2012 | Mueck et al. |
| 2012/0028671 A1 | 2/2012 | Niu et al. |
| 2012/0033761 A1 | 2/2012 | Guo et al. |
| 2012/0034952 A1 | 2/2012 | Lo et al. |
| 2012/0045003 A1 | 2/2012 | Li et al. |
| 2012/0051287 A1 | 3/2012 | Merlin et al. |
| 2012/0064838 A1 | 3/2012 | Miao et al. |
| 2012/0069828 A1 | 3/2012 | Taki et al. |
| 2012/0076028 A1 | 3/2012 | Ko et al. |
| 2012/0076229 A1 | 3/2012 | Brobston et al. |
| 2012/0088512 A1 | 4/2012 | Yamada et al. |
| 2012/0092217 A1 | 4/2012 | Hosoya et al. |
| 2012/0100802 A1 | 4/2012 | Mohebbi |
| 2012/0115523 A1 | 5/2012 | Shpak |
| 2012/0155349 A1 | 6/2012 | Bajic et al. |
| 2012/0155397 A1 | 6/2012 | Shaffer et al. |
| 2012/0163257 A1 | 6/2012 | Kim et al. |
| 2012/0163302 A1 | 6/2012 | Takano |
| 2012/0170453 A1 | 7/2012 | Tiwari |
| 2012/0170672 A1 | 7/2012 | Sondur |
| 2012/0201153 A1 | 8/2012 | Bharadia et al. |
| 2012/0201173 A1 | 8/2012 | Jain et al. |
| 2012/0207256 A1 | 8/2012 | Farag et al. |
| 2012/0212372 A1 | 8/2012 | Petersson et al. |
| 2012/0213065 A1 | 8/2012 | Koo et al. |
| 2012/0218962 A1 | 8/2012 | Kishiyama et al. |
| 2012/0220331 A1 | 8/2012 | Luo et al. |
| 2012/0230380 A1 | 9/2012 | Keusgen et al. |
| 2012/0251031 A1 | 10/2012 | Suarez et al. |
| 2012/0270531 A1 | 10/2012 | Wright et al. |
| 2012/0270544 A1 | 10/2012 | Shah |
| 2012/0281598 A1 | 11/2012 | Struhsaker et al. |
| 2012/0314570 A1 | 12/2012 | Forenza et al. |
| 2012/0321015 A1 | 12/2012 | Hansen et al. |
| 2012/0327870 A1 | 12/2012 | Grandhi et al. |
| 2013/0010623 A1 | 1/2013 | Golitschek |
| 2013/0017794 A1 | 1/2013 | Kloper et al. |
| 2013/0023225 A1 | 1/2013 | Weber |
| 2013/0044877 A1 | 2/2013 | Liu et al. |
| 2013/0051283 A1 | 2/2013 | Lee et al. |
| 2013/0058239 A1 | 3/2013 | Wang et al. |
| 2013/0070741 A1 | 3/2013 | Li et al. |
| 2013/0079048 A1 | 3/2013 | Cai et al. |
| 2013/0094437 A1 | 4/2013 | Bhattacharya |
| 2013/0094621 A1 | 4/2013 | Luo et al. |
| 2013/0095780 A1 | 4/2013 | Prazan et al. |
| 2013/0101073 A1 | 4/2013 | Zai et al. |
| 2013/0150012 A1 | 6/2013 | Chhabra et al. |
| 2013/0156016 A1 | 6/2013 | Debnath et al. |
| 2013/0156120 A1 | 6/2013 | Josiam et al. |
| 2013/0170388 A1 | 7/2013 | Ito et al. |
| 2013/0172029 A1 | 7/2013 | Chang et al. |
| 2013/0190006 A1 | 7/2013 | Kazmi et al. |
| 2013/0208587 A1 | 8/2013 | Bala et al. |
| 2013/0208619 A1 | 8/2013 | Kudo et al. |
| 2013/0223400 A1 | 8/2013 | Seo et al. |
| 2013/0229996 A1 | 9/2013 | Wang et al. |
| 2013/0229999 A1 | 9/2013 | Da Silva et al. |
| 2013/0235720 A1 | 9/2013 | Wang et al. |
| 2013/0242853 A1 | 9/2013 | Seo et al. |
| 2013/0242899 A1 | 9/2013 | Lysejko et al. |
| 2013/0242965 A1 | 9/2013 | Horn et al. |
| 2013/0242976 A1 | 9/2013 | Katayama et al. |
| 2013/0252621 A1 | 9/2013 | Dimou et al. |
| 2013/0272437 A1 | 10/2013 | Eidson et al. |
| 2013/0301551 A1 | 11/2013 | Ghosh et al. |
| 2013/0331136 A1 | 12/2013 | Yang et al. |
| 2013/0343369 A1 | 12/2013 | Yamaura |
| 2014/0010089 A1 | 1/2014 | Cai et al. |
| 2014/0010211 A1 | 1/2014 | Asterjadhi et al. |
| 2014/0029433 A1 | 1/2014 | Wentink |
| 2014/0071873 A1 | 3/2014 | Wang et al. |
| 2014/0086077 A1 | 3/2014 | Safavi |
| 2014/0086081 A1 | 3/2014 | Mack et al. |
| 2014/0098681 A1 | 4/2014 | Stager et al. |
| 2014/0119288 A1 | 5/2014 | Zhu et al. |
| 2014/0185501 A1 | 7/2014 | Park et al. |
| 2014/0185535 A1 | 7/2014 | Park et al. |
| 2014/0192820 A1 | 7/2014 | Azizi et al. |

(56) References Cited

U.S. PATENT DOCUMENTS

2014/0204821 A1 7/2014 Seok et al.
2014/0241182 A1 8/2014 Smadi
2014/0307653 A1 10/2014 Liu et al.

FOREIGN PATENT DOCUMENTS

| EP | 2 234 355 | 9/2010 |
|---|---|---|
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |
| WO | WO 2013/192112 | 12/2013 |

OTHER PUBLICATIONS

Notice of Allowance issued by the United States Patent and Trademark Office for U.S. Appl. No. 14/013,190 dated Jul. 25, 2014.
Office Action issued by the United States Patent and Trademark Office for U.S. Appl. No. 14/198,280 dated Jul. 29, 2014.
Office Action issued by the United States Patent and Trademark Office for U.S. Appl. No. 14/042,020 dated Jul. 31, 2014.
Notice of Allowance issued by the United States Patent and Trademark Office for U.S. Appl. No. 14/010,771 dated Aug. 6, 2014.
Office Action issued by the United States Patent and Trademark Office for U.S. Appl. No. 14/306,458 dated Aug. 13, 2014.
Office Action issued by the United States Patent and Trademark Office for U.S. Appl. No. 14/297,898 dated Aug. 15, 2014.
Notice of Allowance issued by the United States Patent and Trademark Office for U.S. Appl. No. 14/085,252 dated Aug. 27, 2014.
Office Action issued by the United States Patent and Trademark Office for U.S. Appl. No. 14/181,844 dated Aug. 29, 2014.
Office Action issued by the United States Patent and Trademark Office for U.S. Appl. No. 14/296,209 dated Sep. 4, 2014.
Notice of Allowance issued by the United States Patent and Trademark Office for U.S. Appl. No. 14/097,765 dated Sep. 8, 2014.
Notice of Allowance issued by the United States Patent and Trademark Office for U.S. Appl. No. 14/143,580 dated Sep. 8, 2014.
Office Action issued by the United States Patent and Trademark Office for U.S. Appl. No. 14/198,155 dated Sep. 12, 2014.
Office Action issued by the United States Patent and Trademark Office for U.S. Appl. No. 14/173,640 dated Oct. 6, 2014.
Office Action issued by the United States Patent and Trademark Office for U.S. Appl. No. 14/449,431 dated Oct. 10, 2014.
Office Action issued by the United States Patent and Trademark Office for U.S. Appl. No. 14/171,736 dated Oct. 16, 2014.
Notice of Allowance issued by the United States Patent and Trademark Office for U.S. Appl. No. 14/011,521 dated Oct. 20, 2014.
Office Action issued by the United States Patent and Trademark Office for U.S. Appl. No. 14/320,920 dated Oct. 23, 2014.
Notice of Allowance issued by the United States Patent and Trademark Office for U.S. Appl. No. 13/889,150 dated Nov. 10, 2014.
Office Action issued by the United States Patent and Trademark Office for U.S. Appl. No. 13/775,886 dated Nov. 17, 2014.
Notice of Allowance issued by the United States Patent and Trademark Office for U.S. Appl. No. 14/198,280 dated Nov. 18, 2014.
Office Action issued by the United States Patent and Trademark Office for U.S. Appl. No. 14/480,920 dated Nov. 18, 2014.
Office Action issued by the United States Patent and Trademark Office for U.S. Appl. No. 14/481,319 dated Nov. 19, 2014.
Office Action issued by the United States Patent and Trademark Office for U.S. Appl. No. 14/273,866 dated Nov. 28, 2014.
Office Action issued by the United States Patent and Trademark Office for U.S. Appl. No. 14/042,020 dated Dec. 1, 2014.
Office Action issued by the United States Patent and Trademark Office for U.S. Appl. No. 13/888,057 dated Dec. 3, 2014.
Office Action issued by the United States Patent and Trademark Office for U.S. Appl. No. 13/630,146 dated Jan. 22, 2013.
Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.

(56) References Cited

OTHER PUBLICATIONS

Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.
Notice of Allowance issued by the United States Patent and Trademark Office for U.S. Appl. No. 14/068,863 dated Mar. 25, 2014.
Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.
Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.
Office Action issued by the United States Patent and Trademark Office for U.S. Appl. No. 14/085,252 dated Jun. 18, 2014.
Office Action issued by the United States Patent and Trademark Office for U.S. Appl. No. 14/094,644 dated Jun. 24, 2014.
Notice of Allowance issued by the United States Patent and Trademark Office for U.S. Appl. No. 14/102,539 dated Jun. 24, 2014.
Office Action issued by the United States Patent and Trademark Office for U.S. Appl. No. 14/011,521 dated Jul. 1, 2014.
Notice of Allowance issued by the United States Patent and Trademark Office for U.S. Appl. No. 14/109,904 dated Jul. 2, 2014.
Notice of Allowance issued by the United States Patent and Trademark Office for U.S. Appl. No. 13/889,150 dated Jul. 8, 2014.
Office Action issued by the United States Patent and Trademark Office for U.S. Appl. No. 14/250,767 dated Jul. 10, 2014.
Office Action issued by the United States Patent and Trademark Office for U.S. Appl. No. 14/250,767 dated Dec. 26, 2014.
Notice of Allowance issued by the United States Patent and Trademark Office for U.S. Appl. No. 14/097,765 dated Dec. 31, 2014.
Office Action issued by the United States Patent and Trademark Office for U.S. Appl. No. 14/181,844 dated Jan. 5, 2015.
Office Action issued by the United States Patent and Trademark Office for U.S. Appl. No. 14/306,458 dated Jan. 9, 2015.
International Search Report and Written Opinion for International Application No. PCT/US14/65958 dated Jan. 13, 2015.
Notice of Allowance issued by the United States Patent and Trademark Office for U.S. Appl. No. 14/198,155 dated Jan. 26, 2015.
Notice of Allowance issued by the United States Patent and Trademark Office for U.S. Appl. No. 14/296,209 dated Jan. 27, 2015.
Notice of Allowance issued by the United States Patent and Trademark Office for U.S. Appl. No. 13/925,454 dated Feb. 3, 2015.
Office Action issued by the United States Patent and Trademark Office for U.S. Appl. No. 14/173,640 dated Feb. 3, 2015.
International Search Report and Written Opinion for International Application No. PCT/US2014/064185 dated Feb. 5, 2015.
Kai Yang et al., "Coordinated Dual-Layer Beamforming for Public Safety Network: Architecture and Algorithms", Communications (ICC), 2012 IEEE International Conference on, IEEE, Jun. 10, 2012, pp. 4095-4099.
Songtao Lu et al., "A Distributed Adaptive GSC Beamformer over Coordinated Antenna Arrays Network for Interference Mitigation", Asilomar Conference on Signals, Systems and Computers. Conference Record, IEEE Computer Society, US, Nov. 4, 2012, pp. 237-242.
International Search Report and Written Opinion for International Application No. PCT/US2014/065635 dated Feb. 13, 2015.
Notice of Allowance issued by the United States Patent and Trademark Office for U.S. Appl. No. 14/171,736 dated Feb. 20, 2015.
Office Action issued by the United States Patent and Trademark Office for U.S. Appl. No. 14/320,920 dated Feb. 23, 2015.

* cited by examiner

SYSTEM AND METHOD FOR TRANSMIT AND RECEIVE ANTENNA PATTERNS CALIBRATION FOR TIME DIVISION DUPLEX (TDD) SYSTEMS

CROSS REFERENCE TO RELATED APPLICATIONS

This application claims the benefit of prior U.S. Provisional Application Ser. No. 61/909,135 filed 26 Nov. 2013 and prior U.S. Provisional Application Ser. No. 61/946,273 filed 28 Feb. 2014, which are incorporated herein by reference in their entirety.

FIELD OF THE INVENTION

The present invention relates generally to wireless communication systems, and more specifically, to such systems configured to calibrate transmit and receive antenna patterns thereof.

BACKGROUND OF THE INVENTION

Prior to setting forth a short discussion of the related art, it may be helpful to set forth definitions of certain terms that will be used hereinafter.

The term "time division duplex" (TDD) as used herein, is defined for the wireless communication systems is referred to in general for systems using the same frequency spectrum for methods of communications in a time division manner (for example, Wi-Fi, and TDD-long term evolution (LTE) systems).

The term multiple input multiple outputs (MIMO) communication system as defined herein is a communication system that may be used to improve the spectral efficiency, for example, by applying multiple inputs multiple outputs (MIMO) schemes, beam-forming, or nulling (interference mitigation/management). These operations usually require transmitter to have the knowledge of channel state information (CSI) so that a set of pre-coding weights may be set to the multiple data streams to exploit the channels for the multiple spatial channel transmission or to the same data stream to perform the beam-forming or nulling.

Typically, the receiver can feed the CSI or even the preferred pre-coding matrix (index) back to the transmitter. These feedbacks can consume some available bandwidth of the transmission in the opposite direction and reduce the data throughput. If transmission in both directions operate in the same spectrum, like TDD systems, the channels through the air are reversible and the channel information can be estimated by the receive device and then applied to the device's transmission. However, a complete transmission channel should be from the transmitter baseband to the receiver baseband, which includes various components inside the transmitter (e.g., digital to analog converter (DAC), up converter, power amplifier, filter) and receiver such as duplexer, linear amplifier (LNA), down converter, filter, analog to digital converter (ADC). The transmit path and receive path may thus experience very different gain/loss and delays behavior, due to the different components used in both paths. Applying channel reciprocity without considering the different delay and gain/loss factors between the transmit/receive paths are therefore not valid and may not be accurate enough for the use by devices in TDD systems. These parameters may be factory calibrated. However, this calibration may be tedious and costly. In addition, one important element that jeopardizes reciprocity is antennas, which project slightly different radiation patterns at up and down links, due to differences in the Voltage Standing Wave Ratio (VSWR) in both directions. Antenna VSWR may not be practically calibrated in the factory, due to the cost and time of such procedures.

Methods other than factory-calibration known in the art are capable of self-calibrating on transmit and receive paths of the device used in TDD systems. However, these methods may need an extra receive path with attenuator to calibrate transmit/receive (Tx/Rx) paths precisely on various power levels. This may limit the use of the known methods for the devices that are not equipped with the extra receive path.

SUMMARY OF THE INVENTION

According to embodiments of the invention, a calibration method is provided to improve TDD system performance for effectively overcoming the aforementioned difficulties inherent in the art.

Embodiments of the present invention provide calibration of transmit and receive antenna patterns (beam peaks and nulls) for the devices in TDD systems, in which the channel reciprocity may be utilized so that the feedback of channel state information can be reduced or eliminated for beam-forming, nulling (interference mitigation) operations.

Some of the TDD operations, for example, beam-forming and nulling (interference mitigation/management) of a communication device may not need the complete calibration information of the device's Tx and Rx paths for using channel reciprocity. Instead, matching Tx and Rx antenna pattern (peak and null), e.g., finding the weighting offset between the two antenna patterns, may be sufficient for the TDD device to take advantage of the channel reciprocity on certain applications. Embodiments of the invention provide a method for calibrating a device's transmit and receive antenna patterns (e.g., obtaining the weighting offset for the two antenna patterns) is disclosed herein for a TDD device (for example, Wi-Fi) to enable the use of the channel reciprocity.

According to an embodiment of the invention, communication devices are provided in a TDD system. The communication devices may include mobile devices such as user equipment (UE). A UE may include any end user device with wireless connectivity such as a smart telephone, a laptop or a tablet personal computer (PC). The communication device may include a plurality of M antennas for beam-forming or nulling operations. Each antenna may be used for both transmission and receiving.

According to one embodiment of this invention, the communication device may perform a calibration processes to find the weight (for example, the relative phase setting) difference for matching transmit and receive antenna patterns (peaks and nulls) so that the channel reciprocity may be applied in the TDD system.

According to one embodiment of the invention, the said calibration process may include measuring transmit and receive antenna patterns of the device; or finding out the weights (for example, the relative phase setting between two antennas) of the antenna pattern nulls or peaks.

According to one embodiment of the invention, the said antenna pattern measurements may be carried out with the direct radio frequency (RF) signal measurement or through system performance evaluation (for example, MCS—modulation coding set).

According to one embodiment of this invention, the said antenna pattern measurements (or calibration procedure) may be performed at the location that has line-of-sight view to the Wi-Fi access point (AP) (or base station) and is close to the AP to minimize the interference and to mitigate the fading situation.

According to one embodiment of the invention, the line-of-sight view may be confirmed if the difference of received signal strength indicator (RSSI) from the receive antennas are within a pre-set threshold (for example, 3 dB), and if the fluctuation (due to fading) of received signal strength indicator (RSSI) from each of the receive antennas are within a pre-set threshold (for example, 3 dB).

According to one embodiment of the invention, the closeness of the calibrated device to an AP (or base station) may be confirmed if the received signal powers from each of the receive antennas are within a pre-set range (for example, −25 to −50 dBm in WiFi device calibration).

According to one embodiment of the invention, the receive antenna pattern may be obtained through for example a coherent combining process (for example, the maximum ratio combining) on the received signals from receive antennas, while varying the combining weight of the signals over a pre-set range (for example, varying the relative phase over a range of 0 to 360 degrees).

According to another embodiment, the weight setting for the null or peak of receive antenna pattern may be obtained by performing the channel estimation on the signal from each receive antenna.

A direct RF measurement for the transmit antenna pattern (transmit power vs. the relative phase between the transmit antennas) may not be feasible. According to one embodiment of the invention, the transmit antenna pattern may be represented by system performance parameter, for example, the measured data rate or feedback data rate or feedback channel information, instead of transmit RF power, versus the relative phase between the two antenna signals.

According to one embodiment of the invention, the communication device may transmit the same signal (same data from a large file) with equally amplitude (power) through the transmit antennas while changing the relative phase between the two signals (or antennas), and collects the system performance information (for example, MCS—modulation coding set) to represent the transmit antenna pattern.

According to one embodiment of the invention, for the said transmit antenna pattern measurement, the data rate (for example, MCS—Modulation and Coding Set fed back from base station, or the transmit data rate count when the fixed data rate transmission and re-transmission scheme is used) may be collected to represent the transmit antenna pattern.

The system parameters (for example, data rate) for a transmit null may not be reliably obtainable, due to the low signal-to-noise ratio at null. According to one embodiment of this invention, the weight setting for the null may be extrapolated from the parameter slopes (for example, data rate changes) on the relatively reliable data on both sides of the null.

According to another embodiment, the weight setting for the null of an antenna pattern may be confirmed with the weight setting for the peak, which should occur at 180 degrees away from the null setting.

According to another embodiment of the invention, the antenna pattern calibration may be applied to the antenna pattern formed by any number of antennas.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be more fully understood by reference to the following detailed description when read with the accompanying drawings in which:

Figure 1A:
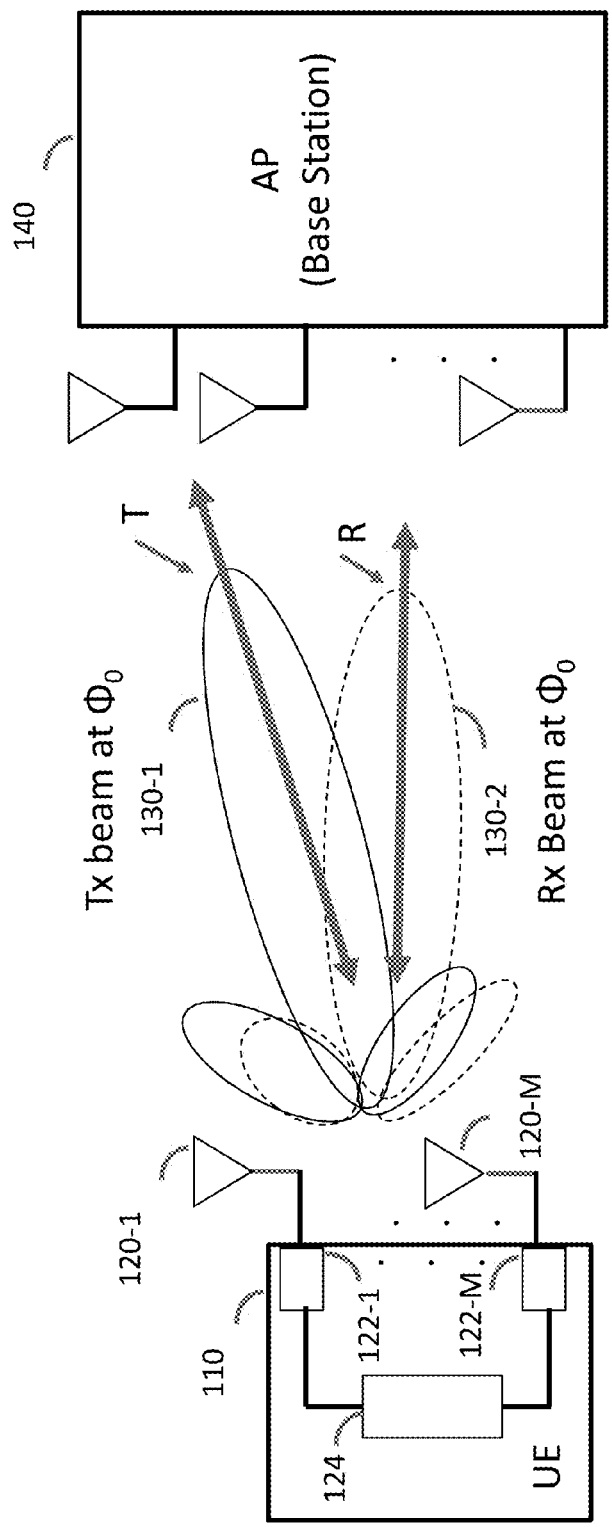
FIG. 1A shows that a station may have the unmatched Transmit and receive antenna patterns when assigning the same weight (relative phase) for transmit antennas and receive antennas, according some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer processor or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In accordance with the present invention and as used herein, the following terms are defined with the following meanings, unless explicitly stated otherwise.

As defined above, in TDD a single channel (e.g., the same or overlapping frequency spectrum) is used for both downlink and uplink transmissions. For example, both stations and their served access point in WiFi systems use the same frequency channel alternatively in time to communicate each other. Alternatively TDD cellular communication, e.g., between a mobile device and a base station, may periodically alternate between uplink transmissions (e.g. from the mobile device to a base station for a predetermined uplink interval or period, such as, 5 milliseconds (ms)) and downlink transmissions (e.g. from a base station to a mobile device or UE for a predetermined downlink period, such as, 5 ms). The base station typically coordinates the alternating timing between uplink (UL) and downlink (DL) transmissions.

Embodiments of the present invention propose the calibration procedures to derive the correction factors (weight difference) on matching transmit and receive antenna patterns of a TDD device. This correction factor information may enable the device perform the beam-forming and/or nulling application for improving the spectral efficiency in TDD (e.g., Wi-Fi) systems.

FIG. 1A is a block diagram showing a system according to some embodiments of the present invention. The example system is a Wi-Fi (e.g., TDD) system with unmatched transmit and receive antenna patterns. Station 110 may include for example a computer processor 124 (for example a baseband processor), M antennas 120-1 . . . , 120-M, and M radio circuits 122-1 . . . , 122-M. Radios circuits 122-1 . . . , 122-M may include various radio frequency (RF) circuitries such as gain amplifiers, phase shifters and switches. Each of antennas 120-1 . . . , 120-M may be used for both transmit and receive so that M radios circuits 122-1 . . . , 122-M transmit and receive on a common channel (e.g. same frequency band); Access Point (AP) 140 may also have multiple (N) antennas. In transmit antenna pattern 130-1, T indicates the relative transmit gain with the relative phase of transmit antennas set at $\Phi_0$. In receive antenna pattern 130-2, R indicates the relative receive gain with the same relative phase ($\Phi_0$) set for the receive antennas. The transmit antenna pattern and the receive antenna pattern are not matched; with the same relative phase setting ($\Phi_0$), the transmit gain (T) is on the peak of the antenna patterns while the receive gain (R) is not.

Figure 1B:
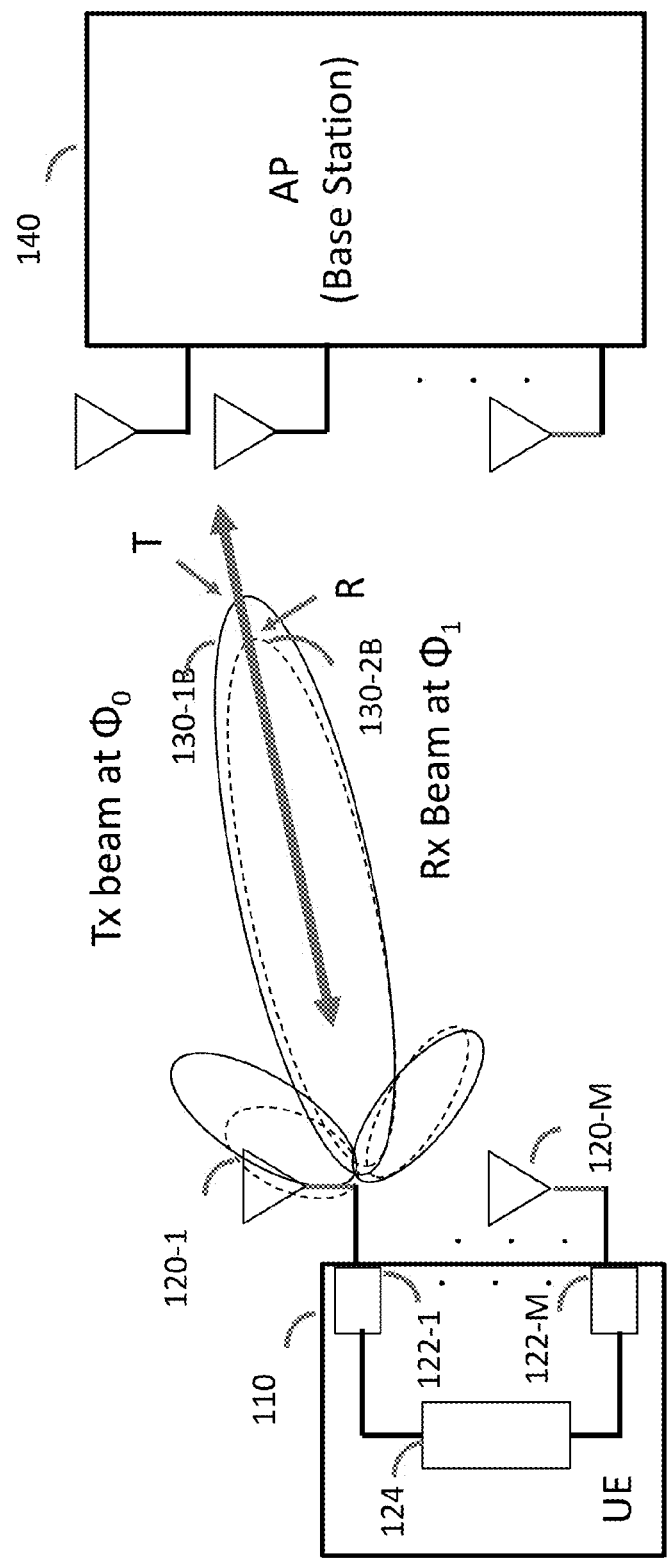
FIG. 1B shows that the station may have the matched transmit and receive antenna patterns with a different weight (relative phase) setting according to some embodiments of the present invention.

FIG. 1B is a block diagram illustrating the same system in FIG. 1A but with different relative phase settings for transmit antennas and receive antennas ($\Phi_0$ and $\Phi_1$, respectively), according some embodiments of the present invention. Station 110 may include a computer processor 124 (e.g., baseband processor), M antennas 120-1 . . . , 120-M, and M radios circuits 122-1 . . . , 122-M, each antenna may be used for both transmit and receive.

Computer processor 124 (e.g. a baseband processor) may be configured to carry out embodiments of the present invention e.g., by including dedicated circuitry and/or executing software or code. In operation, computer processor 124 may be configured to calculate a weight setting difference between transmit and receive antenna pattern, wherein the antenna pattern is a peak-null pattern of the plurality of antennas operating together.

Specifically, the receive antenna pattern 130-2B, may then be matched to the transmit antenna pattern 130-1B, with these relative phase settings; both transmit and receive gains (T and R) are on the peaks of transmit and receive antenna patterns. The calibration is to find the difference between the relative phase settings ($\Phi_0$ and $\Phi_1$) so that the TDD device may perform beam-forming and nulling without the feedback from AP (or base station) and thus improve the spectral efficiency of the TDD system. Embodiments of the invention include the calibration procedures.

According to some embodiments of the present invention, the weight setting difference for each of the antennas may be calculated by computer processor 124 for matching transmit and the receive antenna pattern.

According to some embodiments of the present invention, the calculation by computer processor 124 may be based on null measurements in the transmit antenna pattern.

According to some embodiments of the present invention, the calculating of the antenna pattern by computer processor 124 may be carried out by direct radio (RF) signal measurements.

According to some embodiments of the present invention, the calculating of the antenna pattern by computer processor 124 may be carried out based on baseband parameters associated with performance of the system.

According to some embodiments of the present invention, the phase calculation may be carried out by computer processor 124 at a location being at a line of sight (LOS) from another communication device in TDD communication system. The LOS location may be confirmed based on received signal strength indicator (RSSI) within a pre-set range.

According to some embodiments of the present invention, the calculating of the antenna pattern by computer processor 124 may be carried out by coherently combining the received signals from receive antennas, while varying the combining weight of the signals over a range of, for example, 0 to 360 degrees.

According to some embodiments of the present invention, computer processor 124 may be further configured to average the combined signal power for a phase setting until a stable averaged value is reached for the receive antenna pattern measurement. A stable averaged value may be defined as a fluctuation of the average values does not exceed a pre-set threshold.

According to some embodiments of the present invention, the computer processor 124 may be further configured to pre-set a threshold of the discrepancy of the received signal strength, to determine if the received signals are to be included in the average.

According to some embodiment of the present invention, the computer processor 124 deduces the antenna pattern by applying channel estimation on the received signal from each antenna.

According to some embodiment of the present invention the computer processor 124 deduces the receive null by adding 180 degree to the phase setting of the receive peak.

According to some embodiment of the present invention the computer processor 124 may be configured to transmit the same signal with equal amplitude through the transmit antennas while varying the relative phase between the two signals, and collects the data rate information for the said transmit antenna pattern measurement.

According to some embodiments of the present invention the computer processor 124 may be configured to count the transmission data rates for performing the said transmit antenna pattern measurement if the calibrated transmit data rate is not scheduled by the receiver.

According to some embodiments of the present invention the computer processor 124 may be configured to utilize feedback information to determine data rates for performing the said transmit antenna pattern measurement if the calibrated device' transmit data rate is dynamically scheduled by the receiver.

According to some embodiments of the present invention the computer processor 124 may be configured to extrapolate from the two reliable measured transmit data rates and their corresponding phase settings.

According to some embodiments of the present invention the computer processor 124 may be configured to calculate the offset of phase settings for transmit and receive antenna patterns by comparing the phase settings of the transmit and receive nulls.

Embodiments of the calibration procedures are configured to obtain the difference of weight (relative phase) settings between the transmit null (peak) and the receive null (peak).

Figure 2:
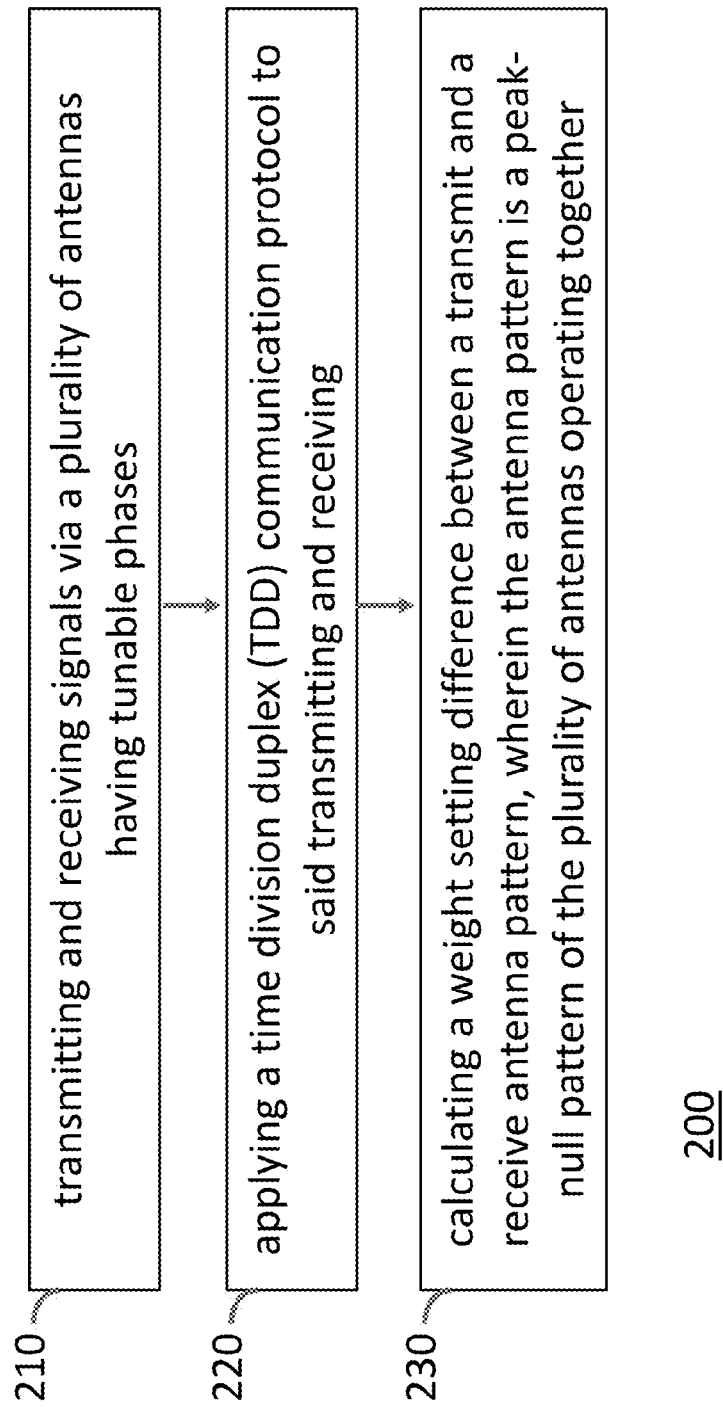
FIG. 2 shows a high level flowchart illustrating a method according to some embodiments of the present invention.

FIG. 2 shows a high level flowchart illustrating a method 200 according to some embodiments of the present invention. Method 200 may include the following steps: transmitting and receiving signals via a plurality of antennas having tunable phases 210; applying a time division duplex (TDD) communication protocol to said transmitting and receiving 220; and calculating a weight setting difference between a transmit and a receive antenna pattern, wherein the antenna pattern is a peak-null pattern of the plurality of antennas operating together 230.

Figure 3:
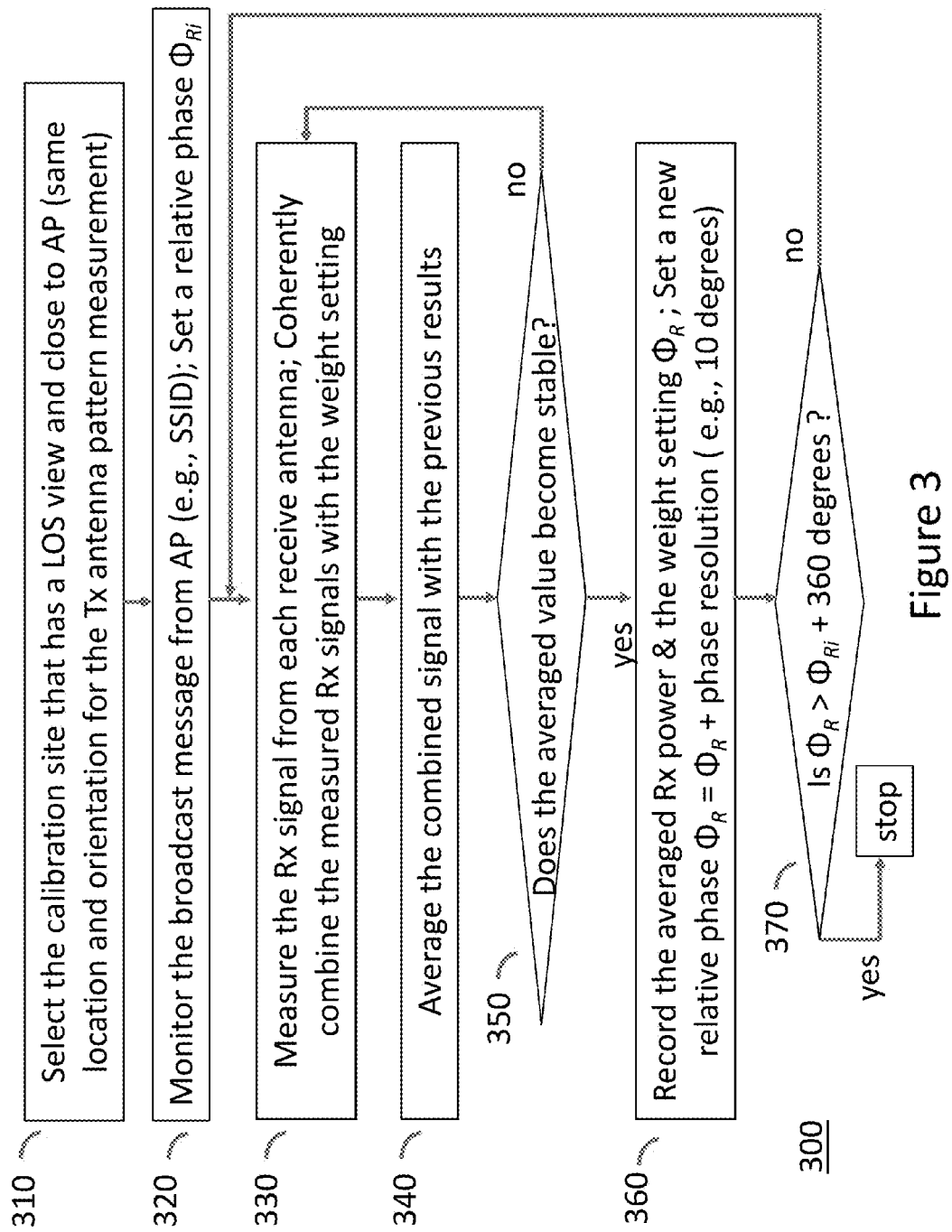
FIG. 3 depicts the procedures for measuring receive antenna patterns according to some embodiments of the present invention.

FIG. 3 is a flowchart 300 illustrating procedures for measuring receive antenna patterns according some embodiments of the present invention. Step 310 shows that the calibration (e.g., receive and transmit antenna pattern measurements) may be performed at the location where the device is, which preferably has a Line-Of-Sight (LOS) view to the AP (or base station) and close to the AP to minimize the impact of the multiple paths, interference, and fading. The line-of-sight view may be defined quantitatively. For example, LOS may be confirmed if the difference of received signal strength indicator (RSSI) from the receive antennas are within a pre-set threshold (for example, 3 dB) and if the fluctuation (due to fading) of received signal strength indicator (RSSI) from each of the receive antennas are within a pre-set threshold (for example, 3 dB). The closeness of the calibrated device to AP (or base station) may be defined quantitatively as well. For the example of the Wi-Fi device calibration, the closeness may be confirmed if the received signal powers from each of the receive antennas are within a pre-set range (for example, −25 to −50 dBm).

For receive antenna pattern measurement, Step 320 shows that the device may monitor the constant signal broadcasted from AP (or base station), for example, the Service Set Identifier (SSID) from Wi-Fi AP or system broadcast message (including pilot) from base station. An initial relative phase $\Phi_{Ri}$ may be set in Step 320 as well. Step 330 shows that the device under calibration may measure the received signals from each receive antenna and coherently combine them with the weight (relative phase) setting. For example, the combined signal power $C(\Phi_R) = a^2 + b^2 + 2*a*b*\cos(\Phi_R)$, where a and b are the received signal strength (amplitude) from each of the two antenna and $\Phi_R$ is the relative phase setting (may be $\Phi_{Ri}$ for the initial measurement). Step 340 shows that the combined signal powers may then be averaged over many repeated measurements until the average value becomes stable (for example, the average values fluctuates within a pre-set value say, 1 dB or 20%). The collected signal strength may be discarded and not be input into the averaging if the discrepancy of signal strengths (a and b) exceed a pre-set threshold (for example 1 dB). Step 350 indicates that the received signal measurement and the signal combining using the same relative phase will be repeated if the averaged value is not relative stable. Once the stable averaged combined power becomes stable, 360 shows that the averaged combined power and the corresponding relative phase setting may be stored and a new relative phase may be set by adding the phase resolution (say, 10 degrees) to the current relative phase setting. Step 370 shows that the receive antenna patterns measurement is complete and may be stopped once the measurements have through the full range (360 degrees) of the relative phase settings. Otherwise, continue the measurement with the new phase setting.

Figure 4:
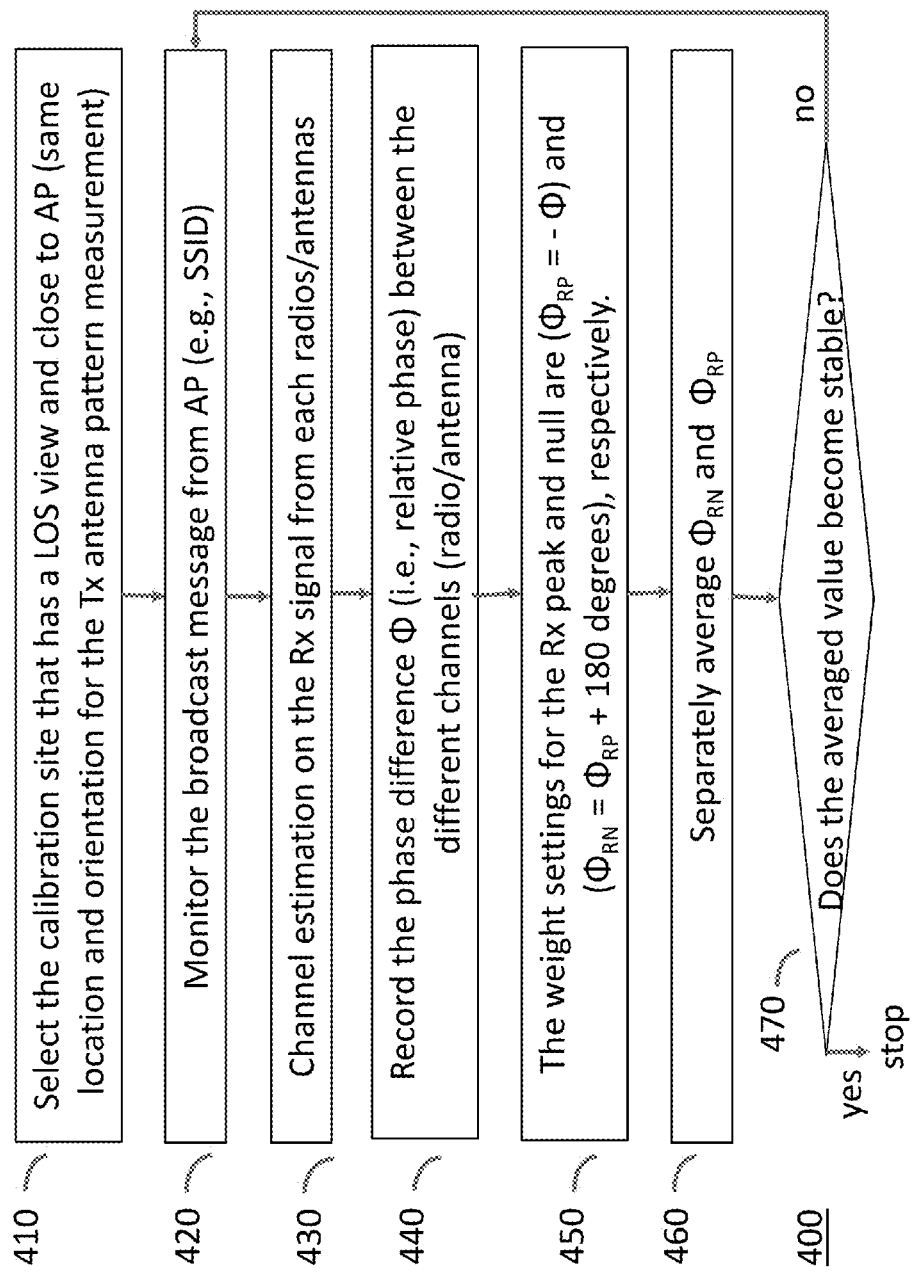
FIG. 4 depicts the procedures for weight setting measurements for the receive antenna peak and null using a channel estimation method according to some embodiments of the present invention.

In embodiments of the present invention, the calibration is to find the weight (relative phase) between transmit and receive antenna patterns. On certain antenna spacing (for example, distance of the antennas is less than half of the wavelength), the antenna patterns may have a single null (or peak). The antenna pattern offset may be obtained by comparing the relative phase settings of transmit null (or peak) and receive null (or peak). The calibration may then only measure the phase setting for the null (or peak), instead of the measurement for the whole antenna pattern. FIG. 4 is a flowchart 400 illustrating that the calibrated device may perform channel estimation to obtain the relative phase setting for the receive null and peak according some embodiments of the present invention. Step 410 selects the calibration site that has a LOS view and close to AP (same location and orientation for the transmit antenna pattern measurement). The calibration device monitors the constant broadcast message that has a pilot (or reference signal), shown in Step 420. Step 430 shows that the calibrated device may perform channel estimation on the pilot or reference signal. Step 440 indicates that the relative phase $\Phi$ between the two (receive antennas) channels may be found and stored. The phase settings for the receive peak, $\Phi_{RP}$, and null, $\Phi_{RN}$, may then be found as:

$$\Phi_{RP} = -\Phi \quad (1)$$

$$\Phi_{RN} = \Phi_{RP} + 180 (\text{degrees}) \quad (2)$$

Step 460 shows that the phase settings may be separately averaged over several channel estimations. Step 470 indicates that the receive null (peak) measurement is complete and may be stopped once the averaged values become stable. Stability can be achieved when, for example, the fluctuation of the averaged values is less than a pre-set value (e.g., 20%).

A direct RF signal measurement may not be feasible for the transmit antenna pattern. Instead, the system performance, for example, data rate evaluation, may be used for representing the transmit antenna pattern. A transmit antenna pattern may be presented by collected data rates versus the relative phase settings of the transmit antennas. For the transmit antenna measurement, the calibrated device may transmit the equal and constant amplitude signal through the transmit antennas and collect the data rate information for various relative phase settings (between the transmit antennas).

Figure 5:
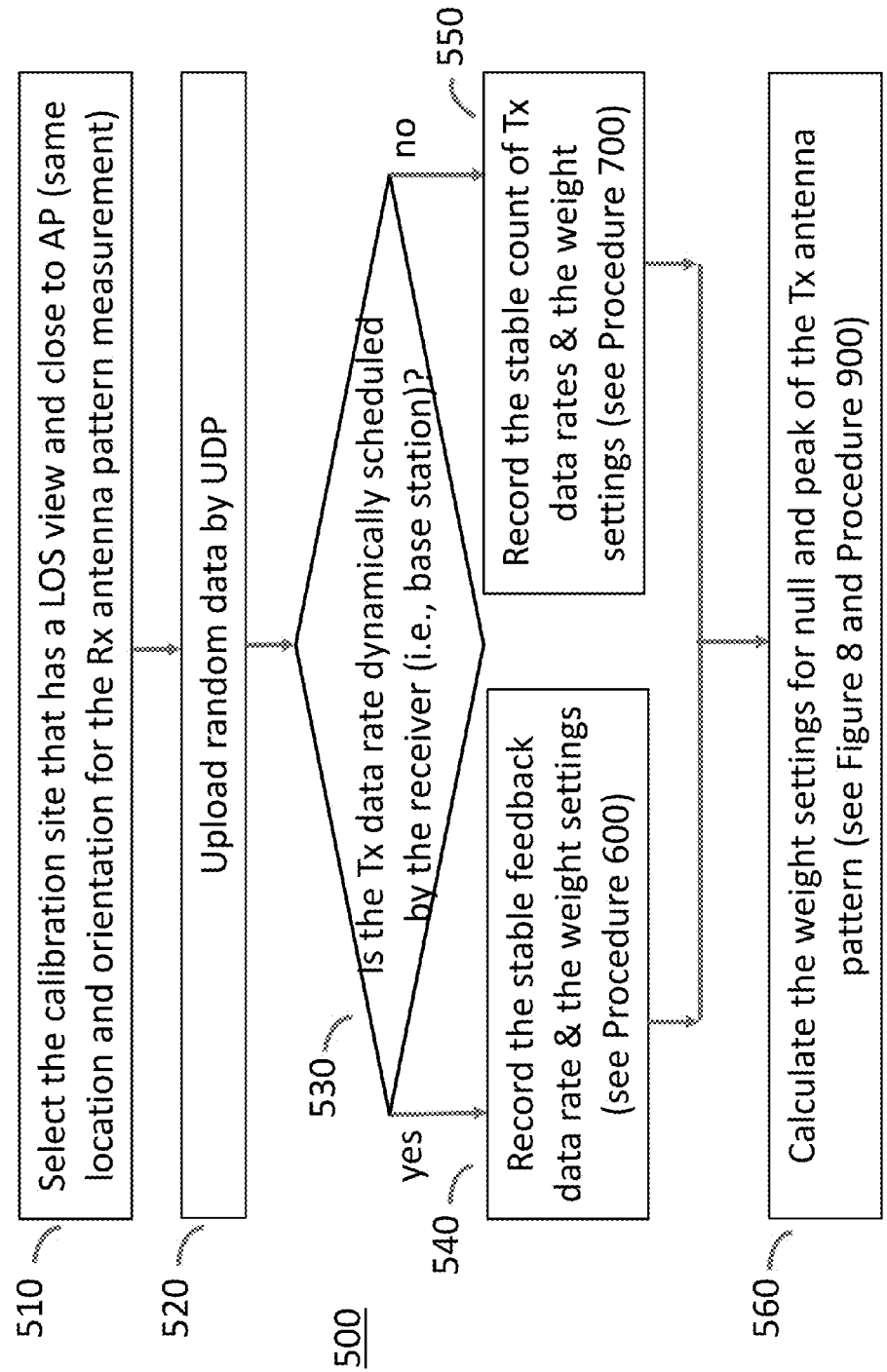
FIG. 5 depicts the procedures for weight setting measurements for the transmit antenna peak and null according to some embodiments of the present invention.

FIG. 5 is a flowchart 500 depicting the procedure to measure the transmit antenna pattern according some embodiments of the present invention. Step 510 indicates that transmit antenna measurement should be done at the same site and the same orientation for receive antenna pattern measurement. Step 520 shows that the calibrated device may perform User Datagram Protocol (UDP) to upload random data until transmit antenna measurement is completed. The data rate count may be based on the feedback data rate information or counted by the calibrated device itself, depending on the system data transmission scheme. Step 530 shows that if the transmit data rate is dynamically scheduled (based on the channel quality) by the receiver (e.g., base station), for example, in TDD-LTE system, the feedback data rate (MCS—Modulation/Coding Set) may then be used for representing the antenna pattern, shown on step 540.

Figure 6:
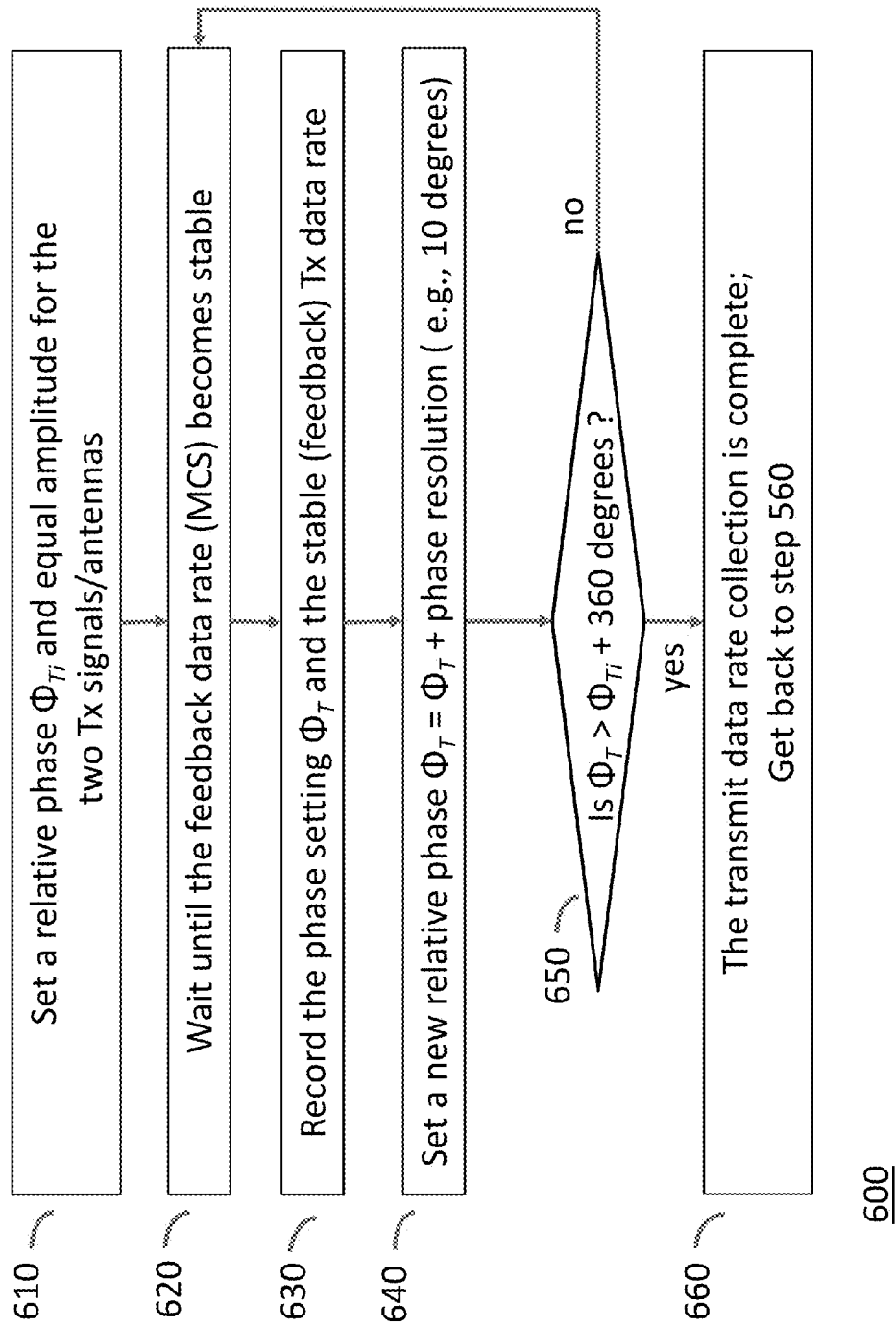
FIG. 6 depicts the procedure of measuring the weight setting and the transmit data rate for the system with dynamically pre-scheduled transmission according to some embodiments of the present invention.

An embodiment of a procedure for the data rate collection based on feedback is shown in FIG. 6 in flowchart 600 according some embodiments of the present invention. As opposed to LTE, for example, in a Wi-Fi system, the transmit data rate is not scheduled by the receiver station, the calibrated device may then count the transmit data rate itself 550.

Figure 7:
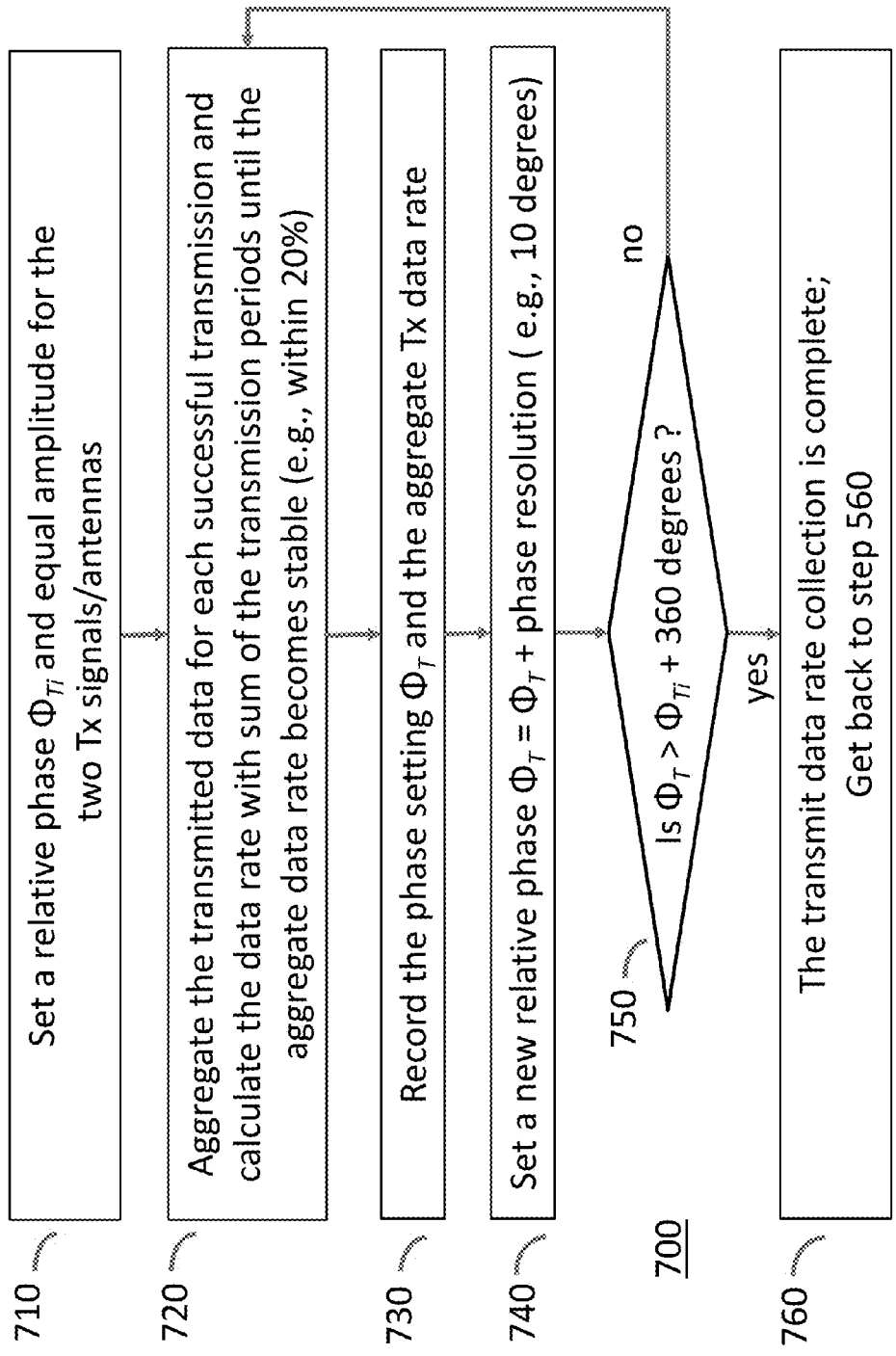
FIG. 7 depicts the procedure of measuring the weight setting and the transmit data rate for the system with non-scheduled transmission according to some embodiments of the present invention.

FIG. 7 is a flowchart 700 showing an embodiment of a procedure for self-counting on the transmit data rate. The data rate count may be limited by the system setup and/or the receiver capability. For example, the received signal (and SNR) may be too low to support any transmit data rate, due to that the transmission is on or around the transmit null. On the other hand, the received signal (and SNR) may far exceed the required SNR to support highest transmit data rate of the system setup when the transmission is on or around the transmission peak. 560 calculate the phase settings for transmit null and peak. The detailed calculation and procedure are described in FIGS. 8 and 9.

For one embodiment of the system with dynamically scheduled transmit data rate by receiver, the feedback data rate information may be collected for representing the transmit antenna pattern. Flowchart 600 of FIG. 6 depicts the procedure to collect the transmit data rate according to one embodiment. Step 610 shows that the calibrated device set a relative phase $\Phi_{Ti}$ and equal amplitude for the two transmit signals/antennas for the UDP transmission. Step 620 indicates that the calibrated device monitor (and use) the feedback MCS until it becomes stable, For example, the feedback MCS is not changed for consecutive pre-set number (say, 10) of feedbacks. The relative phase setting and the feedback data rate (MCS) may then be stored, shown on 630. Step 640 shows that a new phase setting by adding the pre-set phase resolution (say 10 degree) may be set for continuous UDP transmission. Step 650 shows that if data rate collection has through the whole range of the phase settings (360 degrees), the calibrated device may stop the data rate collection and proceed to calculate the phase setting for transmit null and peak shown on 660. Otherwise, it continues the data rate collection with the new phase setting.

For one embodiment of the system with non-scheduled transmit data rate by receiver, the calibrated device may count its transmit data rate for representing the transmit antenna pattern. Flowchart 700 of FIG. 7 depicts the procedure to self-count the transmit data rate according to one embodiment. Step 710 shows that the calibrated device set a relative phase $\Phi_{Ti}$ and equal amplitude for the two transmit signals/antennas for the UDP transmission. In the example of WiFi system, the transmission may be with irregular data size and on the irregular time period, and may be even unsuccessful. Step 720 indicates that the calibrated device may sum the transmitted data for each successful transmission and calculate the data rate with the sum of the transmission periods until the aggregate data rate becomes stable. The relative phase setting and the stable aggregate data rate may then be stored, shown on 730. Step 740 shows that a new phase setting by adding the pre-set phase resolution (say 10 degree) may be set. Step 750 shows that if data rate collection has through the whole range of the phase settings (360 degrees), the calibrated device may stop the data rate collection and proceed to calculate the phase setting for transmit null and peak shown on 760. Otherwise, it continues the data rate collection with the new phase setting.

Figure 8:
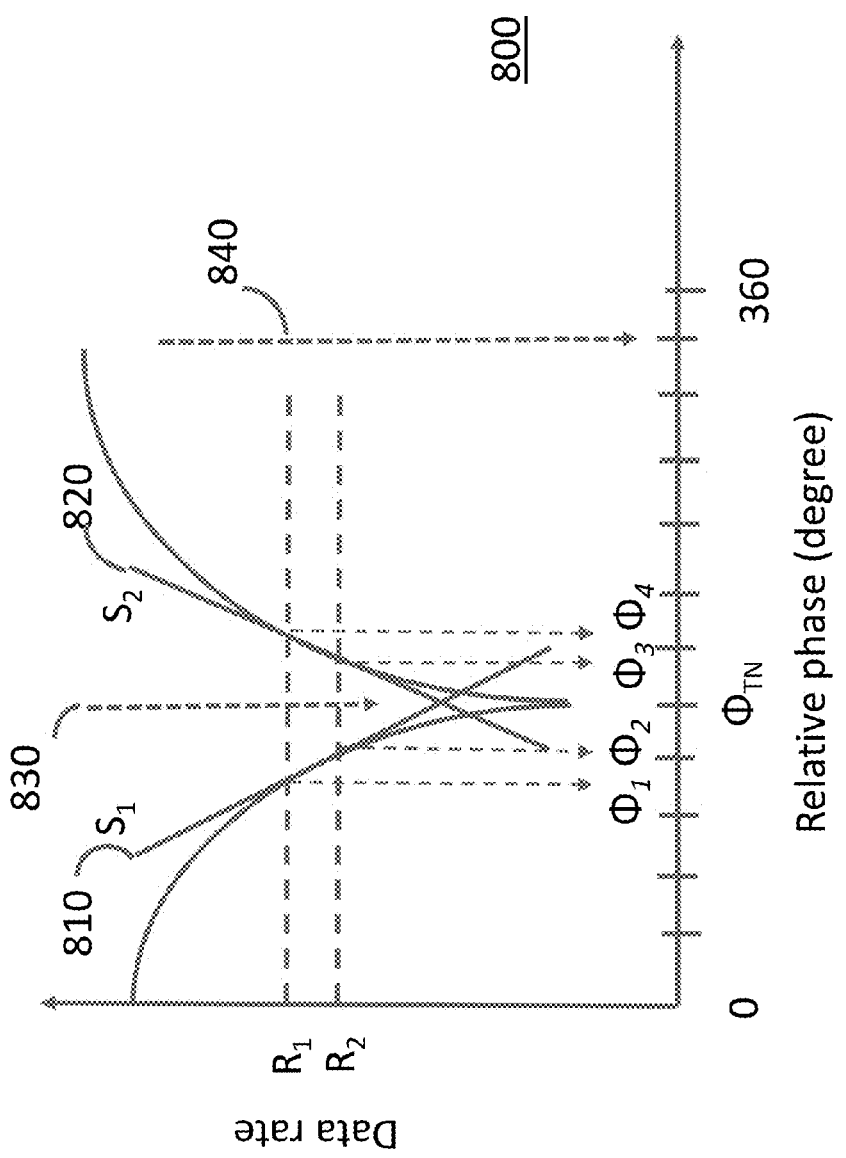
FIG. 8 illustrates the exemplary measured data from which the phase setting for the transmit null may be extrapolated according to some embodiments of the present invention.

FIG. 8 is a graph diagram 800 showing the example of the collected data rate and relative phase settings for obtaining the phase setting of the transmit null and peak according some embodiments of the present invention. In the example, $R_1$ and $R_2$ are the measured data rates in the midrange of the all measured data rates selected for calculate the phase setting for the transmit null. The reasons for selecting the data rates in the midrange are that the data rate measured around the transmit null may be too noisy (and unreliable) and the data rate measured around the transmit peak may be under-stated due to the system limitation and hence not accurate. Each measured data rate may have two phase settings; phase settings of $\Phi_1$ and $\Phi_4$ result in the measured data rate $R_1$ and $\Phi_2$ and $\Phi_3$ for $R_2$, shown in 800. These phase settings ($\Phi_1$, $\Phi_2$, $\Phi_3$, and $\Phi_4$) and the selected data rate (R1 and R2) may form two straight lines $S_1$ (810) and $S_2$ (820). $S_1$ and $S_2$ may then be presented as $$S1: R = [(R_1-R_2)/(\Phi_1-\Phi_2)]* + (R_2*\Phi_1-R_1*\Phi_2)/(\Phi_1-\Phi_2) \qquad (3)$$

$$S2: R = [(R_1-R_2)/(\Phi_4-\Phi_3)]* + (R_2*\Phi_4-R_1*\Phi_3)/(\Phi_4-\Phi_3) \qquad (4)$$

The phase setting of transmit null, $\Phi_{TN}$, is the phase setting corresponding to the intersect point (830) of the two lines. Using Equation 3 and 4, the phase setting of transmit null may be obtained, $$\Phi_{TN} = (\Phi_1*\Phi_3-\Phi_2*\Phi_4)/(\Phi_1-\Phi_2+\Phi_3,-\Phi_4) \qquad (5)$$

840 shows the phase setting for the transmit peak, which is 180 degree away from the transmit null.

Figure 9:
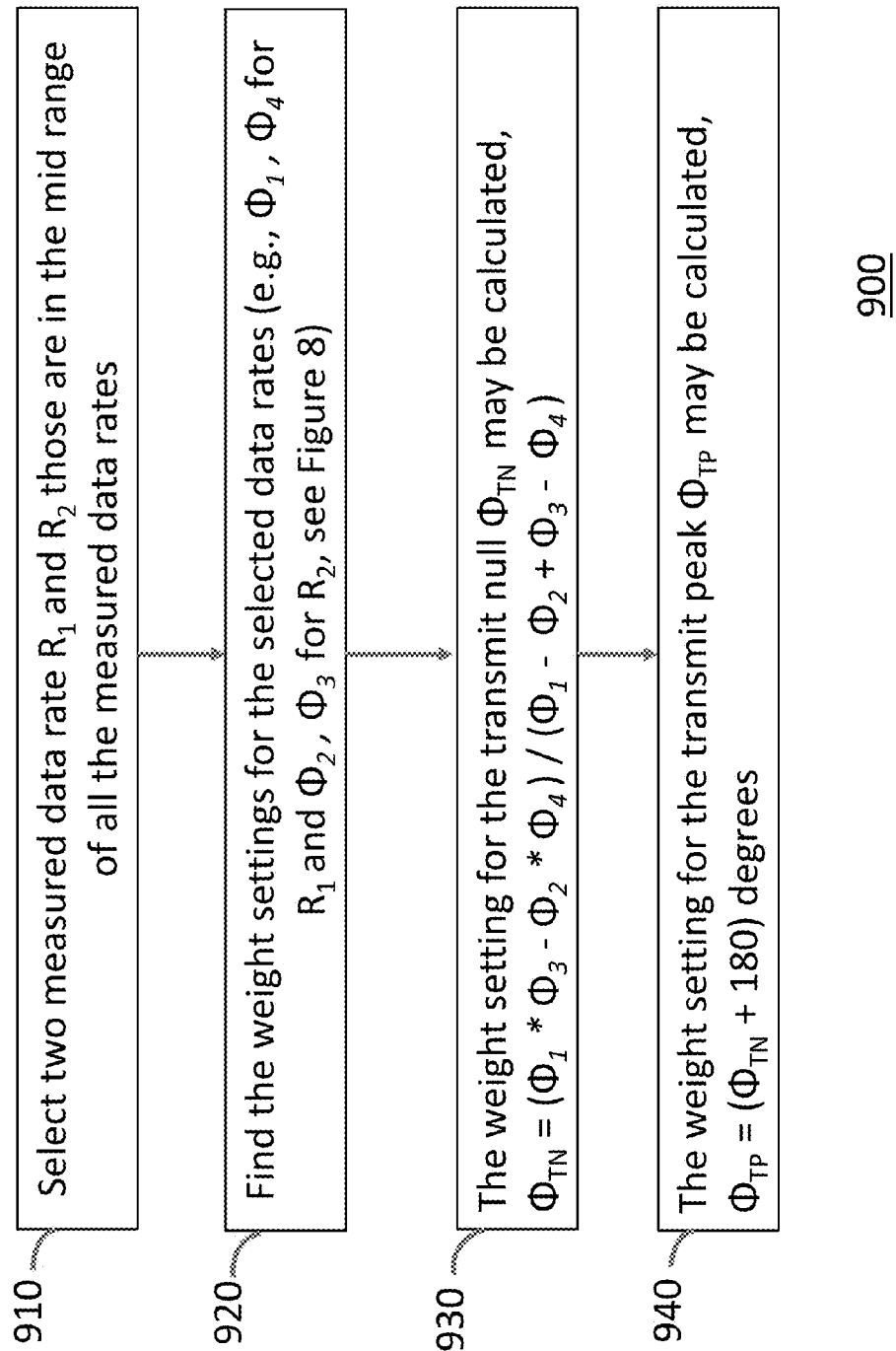
FIG. 9 depicts the procedure for calculating the phase settings for the transmit null and peak using the reliably measured data rates (versus relative phases) according to some embodiments of the present invention.

FIG. 9 is a flowchart 900 depicting the procedure of the invented method to calculate the phase settings of the transmit null and peak according to some embodiments of the present invention. Step 910 shows that two data rates $R_1$ and $R_2$ in the midrange of all the measured data rates may be selected to calculate the phase setting of transmit null. Step 920 is the procedure to find the phase settings for the two selected data rate ($\Phi_1$, $\Phi_4$, $\Phi_2$, and $\Phi_3$). Step 930 shows that the phase setting of transmit null, $\Phi_{TN}$, may be calculated according Equation 5. In step 940 the phase setting for the transmit peak $\Phi_{TP}$ may be calculated, $$\Phi_{TP} = (\Phi_{TN}+180) \text{degrees} \qquad (6)$$

The phase offset of transmit and receive antenna pattern may be obtained by comparing the phase settings for transmit and receive nulls, $\Phi_{TN}$ and $\Phi_{RN}$.

Figure 10:
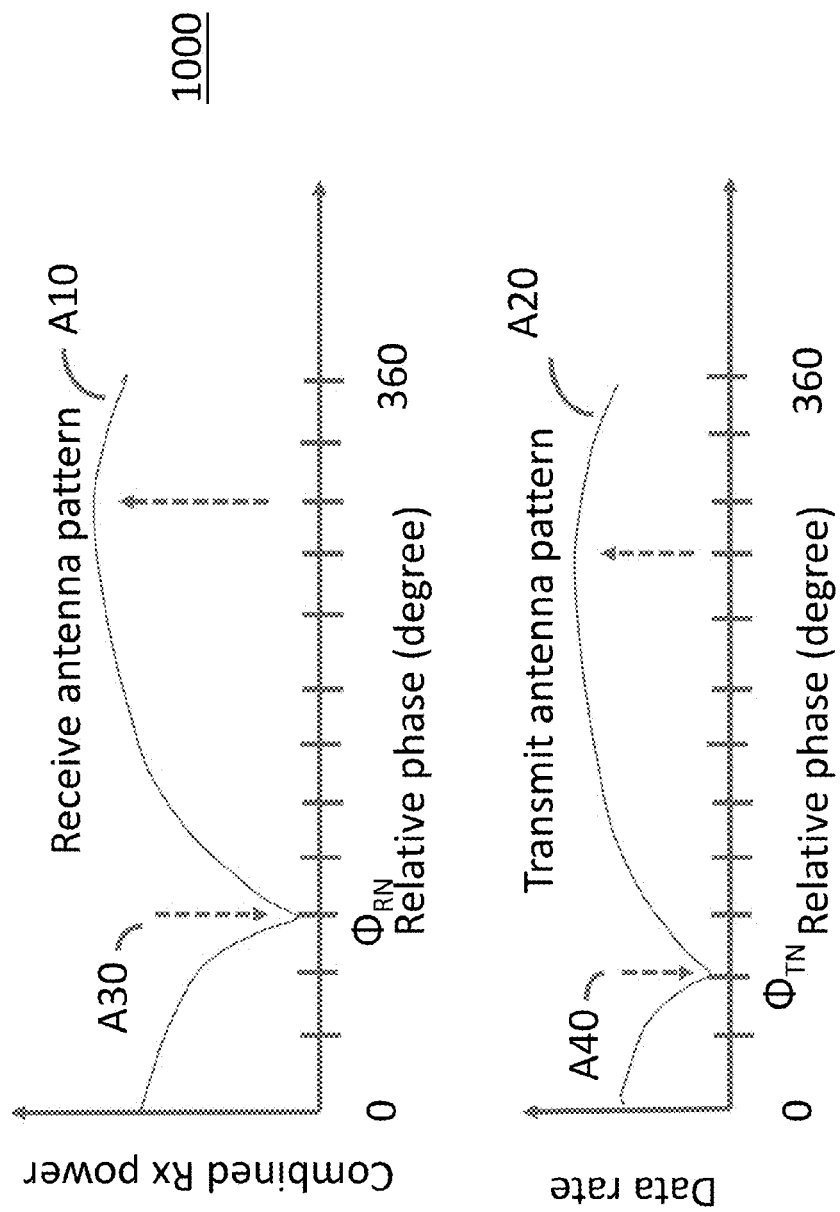
FIG. 10 shows the exemplary collected data from which the calibration results may be obtained by comparing the phase settings of receive null and transmit null (e.g., $\Phi_{RN}$ and $\Phi_{TN}$) according to some embodiments of the present invention.

FIG. 10 shows a graph 1000 exhibiting exemplary collected data for transmit and receive antenna patterns formed by two antennas according to some embodiments of the present invention. In this exemplary figure, A10 and A20 indicate receive and the transmit antenna patterns. From the phase settings of receive null (A30) and transmit null (A40), the calibration procedure according to embodiments of the present invention finds 30 degree phase shift between these two antenna patterns (A10 and A20).

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." For example, a baseband processor or other computer processor may be configured to carry out methods of the present invention by for example executing code or software.

The aforementioned flowcharts and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system comprising:
   a plurality of antennas having tunable phases and configured for both transmitting and receiving;
   a plurality of radio circuits configured to transmit and receive via said antennas in a time division duplex (TDD) communication protocol; and
   a computer processor configured to perform the following steps:
      cause the radio circuits to transmit and receive signals via said antennas in said TDD communication protocol using a plurality of weight settings;
      collect data rate information pertaining to transmission using said weight settings;
      identify a transmit weight setting associated with a transmit null pattern based on a minimum data rate;
      identify a receive weight setting associated with a receive null pattern;
      calculate a difference between the transmit weight setting associated with the transmit null pattern and the receive weight setting associated with the receive null pattern; and
      use said calculated difference to match transmission and reception on said antenna patterns.

2. The system according to claim 1, wherein the radio circuits are further configured to transmit and receive on a common channel.

3. The system according to claim 1, wherein the calculation is based on null measurements in the transmit antenna pattern.

4. The system according to claim 1, wherein the calculating of the antenna pattern is carried out by direct radio (RF) signal measurements.

5. The system according to claim 1, wherein the calculating of the antenna pattern is carried out based on baseband parameters associated with performance of the system.

6. The system according to claim 1, wherein the phase calculation is carried out at a location being at a line of sight from another communication device in TDD communication system.

7. The system according to claim 6, wherein the line of sight location is confirmed based on received signal strength indicator (RSSI) within a pre-set range.

8. The system according to claim 1, wherein the calculating of the antenna pattern is carried out by coherently combining the received signals from receive antennas, while varying the combining weight of the signals over a range of 0 to 360 degrees.

9. The system according to claim 1, wherein the computer processor is further configured to average the combined signal power for a phase setting until a stable averaged value is reached for the receive antenna pattern measurement.

10. The system according to claim 9, wherein said stable averaged value is defined as a fluctuation of the average values does not exceed a pre-set threshold.

11. The system according to claim 9, wherein the computer processor is further configured to pre-set a threshold of the discrepancy of the received signal strength, to determine if the received signals are to be included in the average.

12. The system according to claim 1, wherein the computer processor deduces the antenna pattern by applying channel estimation on the received signal from each antenna.

13. The system according to claim 1, wherein the computer processor deduces the receive null by adding 180 degree to the phase setting of the receive peak.

14. The system according to claim 1, wherein the computer processor is configured to transmit the same signal with equal amplitude through the transmit antennas while varying the relative phase between the two signals, and collects the data rate information for the said transmit antenna pattern measurement.

15. The system according to claim 1, wherein the computer processor is configured to count the transmission data rates for performing the said transmit antenna pattern measurement if the calibrated transmit data rate is not scheduled by the receiver.

16. The system according to claim 1, wherein the computer processor is configured to utilize feedback information to determine data rates for performing the said transmit antenna pattern measurement if the calibrated device' transmit data rate is dynamically scheduled by the receiver.

17. The system according to claim 1, wherein the computer processor is configured to extrapolate from the two reliable measured transmit data rates and their corresponding phase settings.

18. The system according to claim 1, wherein the computer processor is configured to calculate the offset of phase settings for transmit and receive antenna patterns by comparing the phase settings of the said transmit and receive nulls.

19. The system according to claim 1, wherein the computer processor is to identify the receive weight setting associated with a receive null pattern based on a parameter selected from the group consisting of: a received signal strength indicator (RSSI) or a channel estimation.

20. A method comprising:
transmitting and receiving signals via a plurality of antennas having tunable phases using a time division duplex (TDD) communication protocol using a plurality of weight settings;
collecting data rate information pertaining to said weight settings;
identifying a transmit weight setting associated with a transmit null pattern based on a minimum data rate;
identifying a receive weight setting associated with a receive null pattern;
calculating a difference between the transmit weight setting associated with the transmit null pattern and the receive weight setting associated with the receive null pattern; and
using said calculated difference to match transmission and reception on said antenna patterns.

21. The method according to claim 20, wherein the calculating is based on null measurements in the transmit antenna pattern.

22. The method according to claim 20, wherein the calculating of the antenna pattern is carried out by direct radio frequency (RF) signal measurements.

23. The method according to claim 20, wherein the calculating of the antenna pattern is carried out based on baseband parameters associated with performance of the system.

24. The method according to claim 20, wherein the phase calculation is carried out at a location being at a line of sight from another communication device in Time Division Duplex (TDD) communication system.

25. The method according to claim 24, wherein the line of sight location is confirmed based on received signal strength indicator (RSSI) within a pre-set range.

26. The method according to claim 20, wherein the calculating of the antenna pattern is carried out by coherently combining received signals from receive antennas, while varying a combining weight of the signals over a range of 0 to 360 degrees.

27. The method according to claim 20, wherein identifying a receive weight setting associated with a receive null pattern comprises identifying a receive weight setting associated with the receive null pattern based on a parameter selected from the group consisting of: a received signal strength indicator (RSSI) or a channel estimation.

* * * * *